W. J. WILSON.
COTTON CHOPPER.
APPLICATION FILED MAR. 31, 1920.

1,370,078.

Patented Mar. 1, 1921.
4 SHEETS—SHEET 1.

Inventor
W. J. Wilson
By Jack H. Athey
Attorney

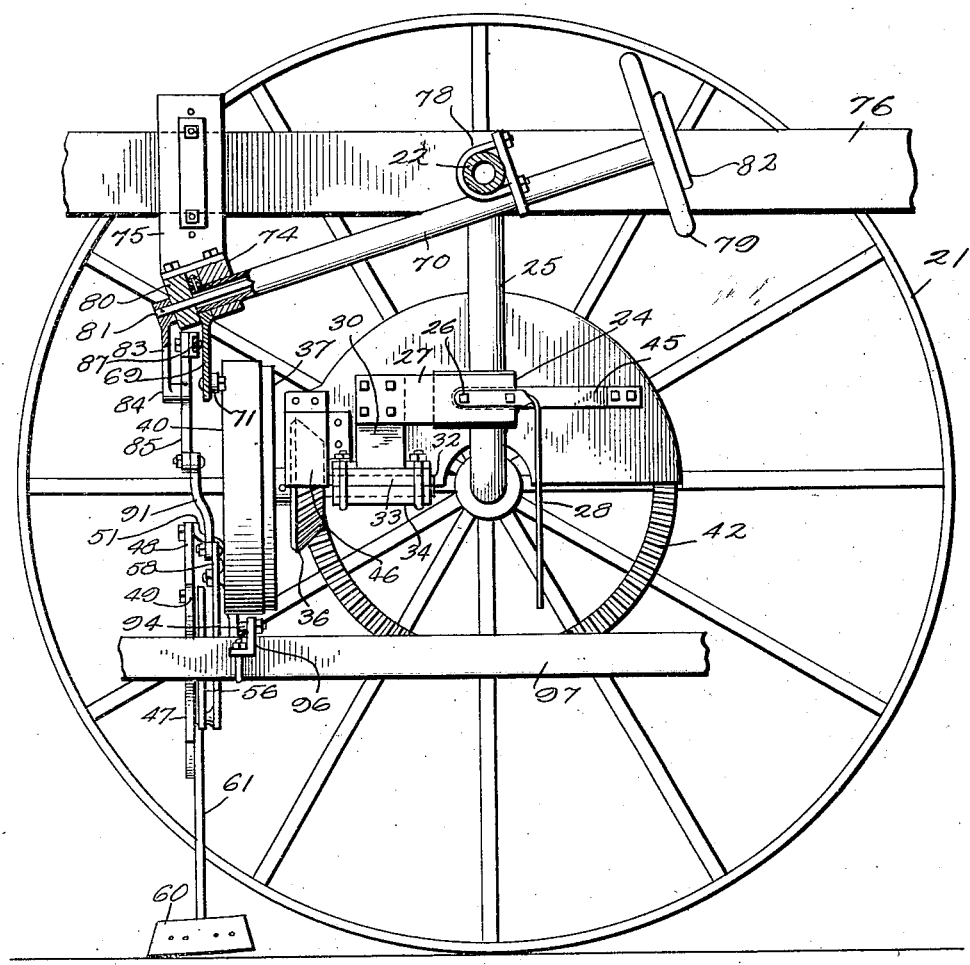

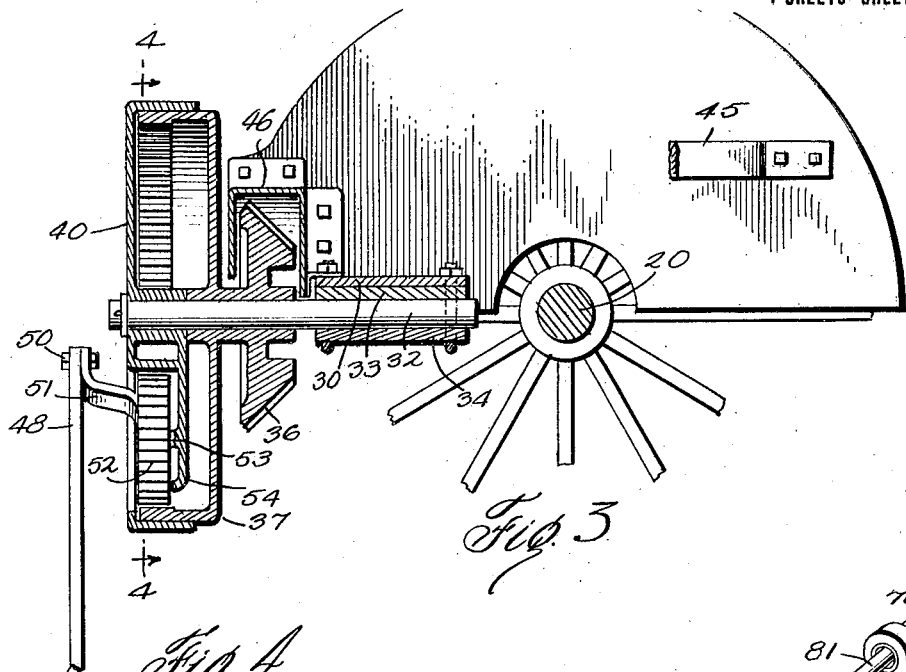
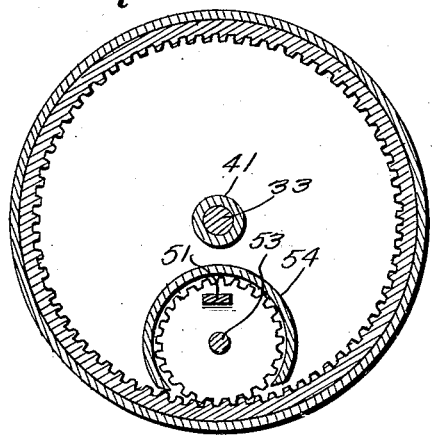
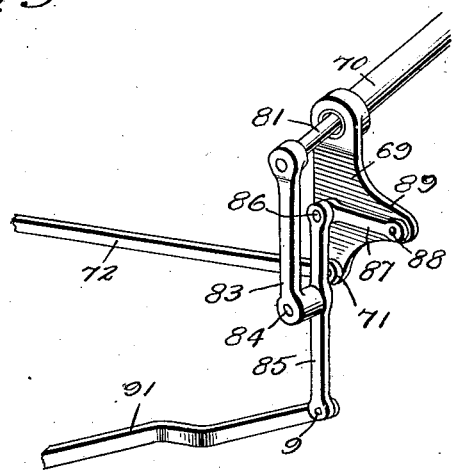
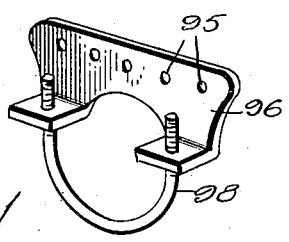

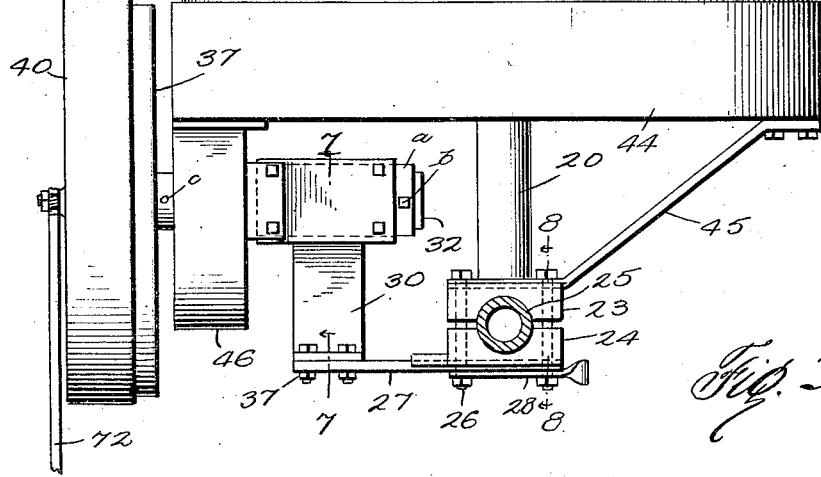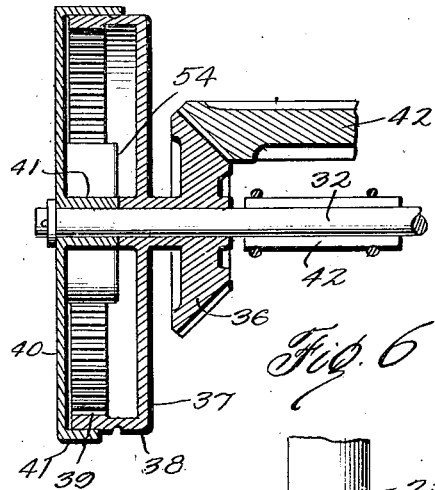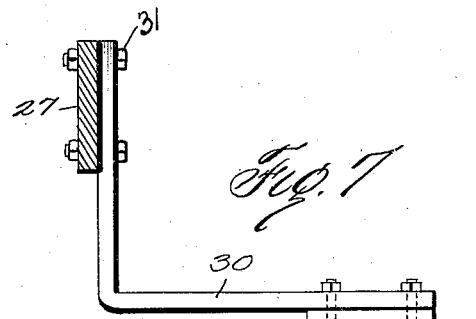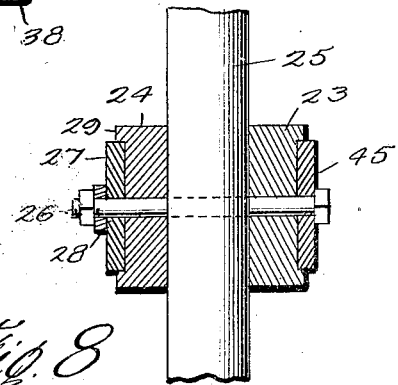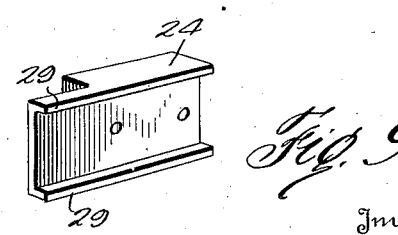

UNITED STATES PATENT OFFICE.

WILLIAM J. WILSON, OF DAVILLA, TEXAS.

COTTON-CHOPPER.

1,370,078.　　　　Specification of Letters Patent.　　Patented Mar. 1, 1921.

Application filed March 31, 1920. Serial No. 370,191.

*To all whom it may concern:*

Be it known that I, WILLIAM J. WILSON, a citizen of the United States, residing at Davilla, in the county of Milam and State of Texas, have invented certain new and useful Improvements in Cotton-Choppers, of which the following is a specification.

My invention relates to cotton chopping means, and has particular reference to such means adapted to be used as an attachment upon a cultivator, while the invention may be embodied in a complete machine.

An important object of the invention is to provide means for effecting the movement of the hoe or chopping element, in approximately an elliptical path, the hoe clearing the plant upon the up-stroke and chopping the same upon the down-stroke.

A further object of the invention is to provide means to vertically adjust the hoe or chopping element independently of its horizontal adjustment, and to horizontally adjust it independently of its vertical adjustment.

A further object of the invention is to provide simple and reliable driving means or gearing, receiving power from one of the traction wheels of the cultivator, and transmitting the same to the chopping element.

A further object of the invention is to provide a chopping attachment, which is adjustable in order that it may be applied to cultivators or the like of different sizes.

Other objects and advantages of the invention will be apparent during the course of the following description.

Figure 1:
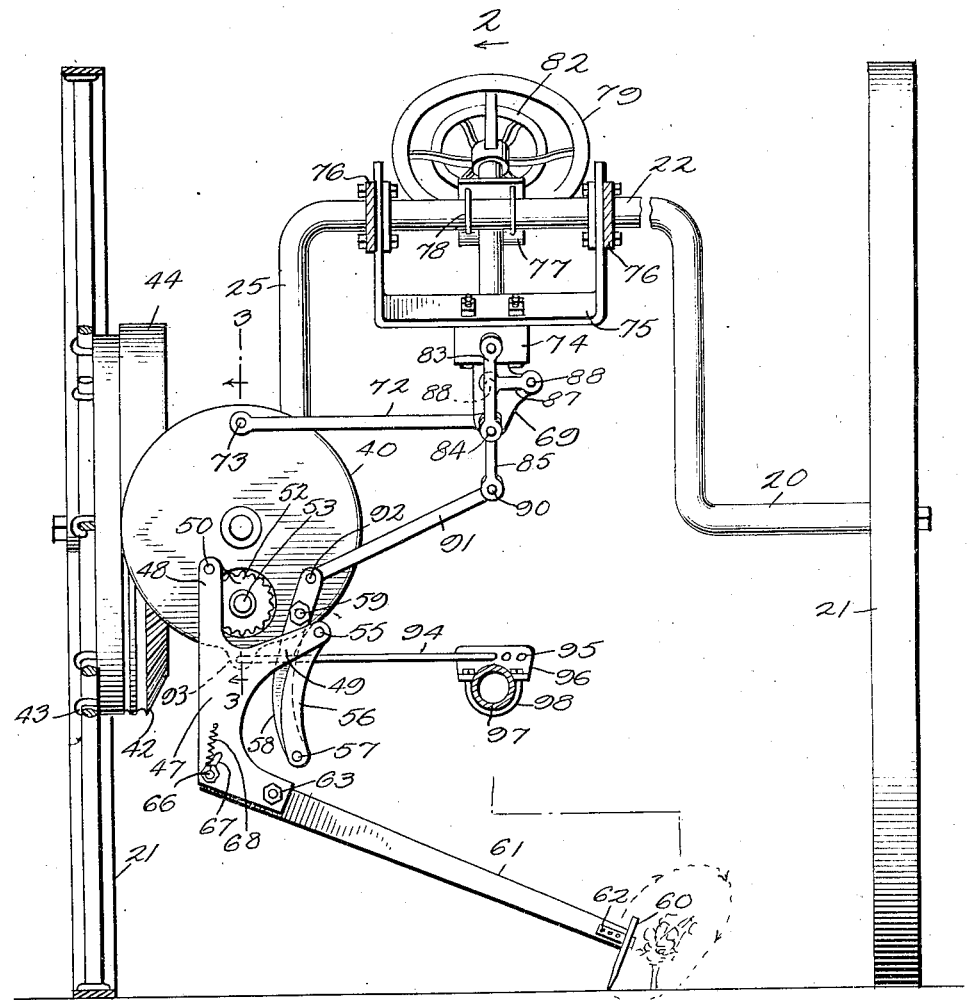
Figures 12, 13:
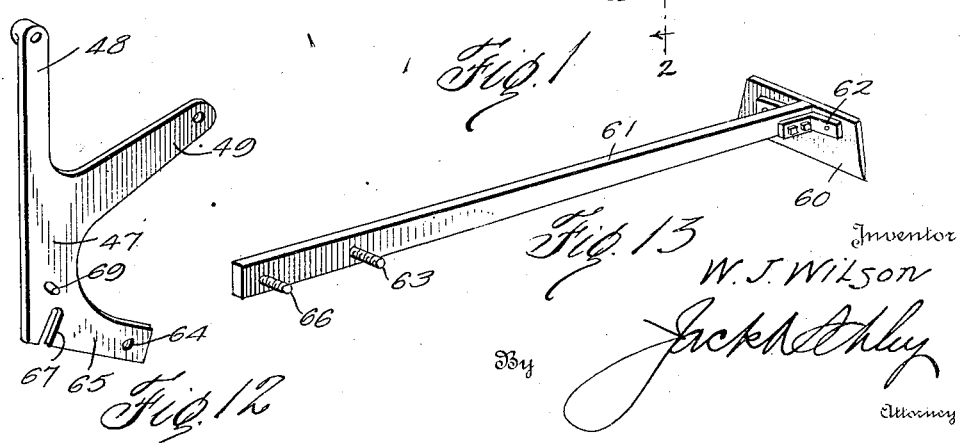

In the accompanying drawings forming a part of this specification and in which like numerals are employed to designate like parts throughout the same, Figure 1 is a front elevation of an attachment embodying my invention, showing the same applied to the arched axle of a cultivator, Fig. 2 is a longitudinal section taken on line 2—2 of Fig. 1, Fig. 3 is a vertical section, taken on line 3—3 of Fig. 1, Fig. 4 is a detail section taken on line 4—4 of Fig. 3, Fig. 5 is a plan view of the driving means or gearing, embodied in the invention, Fig. 6 is a central horizontal section through the interior annular gear and associated elements, Fig. 7 is a detail section taken on line 7—7 of Fig. 5, Fig. 8 is a detail section on line 8—8 of Fig. 5, Fig. 9 is a perspective view of a clamp element, Fig. 10 is a similar view of operating and compensating means, Fig. 11 is a perspective view of a two-part clamp, Fig. 12 is a perspective view of the hoe operating element, Fig. 13 is a similar view of the hoe and arm therefor.

In the drawings, wherein for the purpose of illustration is shown a preferred embodiment of my invention, the numeral 20 designates the axle of a cultivator, or other wheeled implement. This axle is supported by traction wheels 21, as shown. The axle 20 is provided with the usual arched portion 22. The usual means (not shown) are employed to prevent the turning of the axle. The frame-work of the cultivator is omitted as its showing is not thought to be necessary for a proper understanding of the present invention.

As more clearly shown in Figs. 2 and 5, the numerals 23 and 24 designate the two parts of a clamp, having recesses to receive the vertical arm 25 of the axle arch. These two parts are held together by bolts 26, also passing through openings in a horizontal strip or bar 27, and through openings in a plow beam stop 28. As clearly shown in Fig. 9, the part 24 has flanges 29, engaging the strip 27. The numeral 30 designates an L-shaped bracket, one end of which is bolted to the strip 27 at 31, as shown.

The numeral 32 designates a preferably stationary supporting shaft, arranged longitudinally of the machine, and clamped within two parts 33 and 34 of a clamp or bearing, rigidly secured to the L-shaped bracket 30. These parts are held together by U-bolts 35, as shown.

The supporting shaft 32, Fig. 6, has a bevel gear 36, rotatable thereon, see also Fig. 3. This bevel gear is preferably formed integral with a gear member 37, having an annular flange 38, and an interior annular gear 39. The numeral 40 designates a drum, having a hub 41, pivoted upon the shaft 32. The drum 40 has an annular flange 41, slidably engaging the flange 38. The gear 36 is driven by a bevel gear 42, which is clamped to the spokes of the traction wheel 21, by bolts 43 or the like. The bevel gear 42 is arranged within a cover 44, attached to an arm 45, secured to the clamp part 23. A housing or cap 46 is secured to the cover 44 and to the bracket 30, as shown. The bevel gear 36 is arranged within the cap 46.

The numeral 47 designates a hoe or chopper operating element, having an upstanding or vertical arm 48 and a laterally extending or horizontal arm 49. The arm 48 is pivotally connected, at 50, with a crank 51, rigidly secured to an operating gear 52, see Fig. 3. The operating gear is pivoted upon a trunnion or shaft 53, rigidly secured to a portion 54 of the drum 40. As the drum 40 is normally held against turning movement, the rotation of the gear member 37 causes the operating gear 52 to revolve upon its axis. The arm 49, see Fig. 1, is pivoted at 55, with a hobble link 56, which is pivoted at its lower end, as shown at 57, with a master link 58. This master link is pivotally connected at 59, with the drum 40. The pivot 55 is spaced from the upper end of the master link, as shown. The chopper operating member 47 is pivotally supported by the pivot 55, and the rotation of the crank 51 imparts to the same a kind of rotary or elliptical movement, to be described.

The numeral 60 designates a chopper or hoe, preferably having a slight incline at its cutting edge, so that one end thereof engages the ground first. This chopper is rigidly secured to an arm 61, by brackets 62. The arm 61 has pivot bolt 63, spaced from its opposite end, and extending through an opening 64 in a lower arm 65. The arm 61 also has a friction bolt 66, operating within a slot 67. A retractile coil spring 68 is connected with a friction bolt 66, and a stud 69, secured to the operating element 47. The friction bolt 66 normally clamps the arm 61 to the element 47, so that it will not turn upon the pivot 63, but should the hoe 60 encounter a stone or other obstruction, the arm 61 will then turn upon its pivot 63, the same being returned to the normal position upon the element 47 by the spring 68.

Attention is called more particularly to Figs. 1, 2 and 10, wherein means are shown to vertically adjust and horizontally shift the chopper, such adjustments being adapted to be effected independently of each other. Such means comprises a main depending crank 69, clamped or rigidly secured to the forward lower end of an inclined tubular shaft 70. The main crank 69 has pivotal connection, at its lower end, as shown at 71, with a link 72, extending horizontally, as shown, and pivotally connected with the drum 40, at 73. The tubular shaft 70 is journaled within a friction bearing 74, bolted to a U-shaped bracket 75, which is preferably vertically adjustably connected with beams 76 of the cultivator frame, carried by the arched portion 22. The tubular shaft 70 is also rotatable in a bracket 77, clamped to the arch 22 by U-bolts 78. An outer or large hand-wheel 79 is rigidly secured to the rear end of the tubular shaft 70, to turn it. This shaft is therefore adapted to be manually operated, but improper turning thereof is prevented by the friction bearing 74. The numeral 80 designates a second friction bearing, receiving an inner shaft 81, extending through the outer tubular shaft 70, and having a hand-wheel 82, rigidly secured to its rear end. A depending crank 83 is rigidly secured to the forward end of the inner shaft 81, and is pivoted at its lower end at 84, with a compensating link 85. The pivot 84 is near the center of the compensating link 85, and this compensating link has pivotal connection at 86, with a horizontal link 87, pivoted at 88 with a lateral extension 89 of the main crank. The compensating link 85 has pivotal connection at its lower end, as shown at 90, with a link 91, extending laterally for pivotal connection with the upper end of the master link 58, as shown at 92, in Fig. 1.

The drum 40 is provided at its lower side with an apertured ear 93, Fig. 1, pivoted to a rod 94, having one end bent laterally, for insertion within selected openings 95 formed in a bracket 96, clamped to a plow beam 97, by a U-bolt 98.

The operation of the machine is as follows:

The cultivator is drawn longitudinally of the row of cotton, and the rotation of the traction wheel 21 is imparted to the gear 42. This gear rotates the bevel gear 36, in turn driving the gear member 37. This gear member rotates the operating gear 52, revolving the crank 51. This movement of the crank imparts to the element 47, pivotally supported at 55, a complex movement so that it travels in an approximately elliptical path. This movement is transmitted to the chopper or hoe 60, which is caused to move in an elliptical path. As shown in Fig. 1, upon the up-stroke, the chopper 60 clears the plant, but upon the down-stroke it digs into the row and chops out the plant. During the above described operation, the drum 40 is held upon its pivot, against turning movement, by the link 72. It may be desired to shift the chopper 60 horizontally or transversely of the row, in either direction, and to accomplish this the large wheel 79 is turned by the operator. This movement of the large wheel turns the main crank 69 laterally, for instance to the left in Fig. 10, whereby the drum 40 is turned to the left, Fig. 1. This turning movement of the drum 40 will shift pivot 59 to the right, carrying pivot 55 to the right. The chopper 60 is therefore shifted to the right, but as the pivot 59 would also be elevated, the pivot 55 would be elevated and hence the chopper 60 raised. However, as pivot 59 moves to the right and upwardly slightly, the master link 58 is turned upon its pivot 59, causing its lower end to be swung to the left or downwardly, lowering pivot 57. The upper end of the master link 58 is swung to the right, Fig. 1, by the link 91 being shifted to the right. Fig. 10, as compensating link 85 turns upon stationary pivot 84, its upper end being swung to the left by the movement of crank 69 to the left, through the medium of link 87. It therefore follows that a compensating movement occurs, whereby the pivot 55 will be shifted horizontally, and the hoe 60 shifted in a similar manner. To vertically adjust the hoe, the inner wheel 82 is turned, whereby crank 83, Fig. 10 may be swung to the left. The crank 69 being stationary, compensating link 85 will turn upon pivot 86, and link 91 will be shifted to the left, turning the master link 58 upon its pivot, whereby its lower end is swung to the right, Fig. 1, and the hobble link 56 elevated, to raise pivot 55. The wheel 82 is turned in an opposite direction when it is desired to lower the chopper.

It is to be understood that the form of my invention herewith shown and described is to be taken as a preferred example of the same, and that various changes, in the shape, size, and arrangement of parts may be resorted to without departing from the spirit of my invention, or the scope of the subjoined claims.

Having thus described my invention, I claim:

1. In a machine of the character described, a support, a supporting shaft connected therewith, a gear member rotatable upon the shaft and having an annular flange provided with an interior gear, a drum pivotally supported upon the shaft and having an annular flange slidably engaging the first named flange, means to normally hold the drum against turning movement, an operating gear pivotally supported by the drum and engaging the interior gear, an operating element pivotally supported from the drum, a crank connected with the operating gear and connected with the operating element, and a chopping device carried by the operating element.

2. In a machine of the character described, a support, a supporting shaft connected therewith, a gear member rotatable upon the shaft and having an annular flange provided with an interior gear, a drum pivotally supported upon the shaft and having an annular flange slidably engaging the first named flange, an operating gear pivotally supported upon the drum and engaging the interior gear, an operating element, supporting means for the operating element embodying a master link pivoted upon the drum, a crank connected with the operating gear and the operating element, means to normally prevent the drum and the master link turning upon their pivots, and a chopper device carried by the operating element.

3. In a machine of the character described, a support, a supporting shaft connected therewith, a gear member rotatable upon the shaft and provided with a gear, means to drive the gear member, a drum pivoted upon the shaft, an operating gear carried by the drum and engaging the first named gear, a crank secured to the operating gear, an operating element pivotally connected with the crank, a hobble link pivotally connected with the operating element, a master link pivoted to the hobble link and with the drum, operating means connected with the drum and the master link, and a chopping device carried by the operating element.

4. In a machine of the character described, a support, a supporting shaft carried thereby, a gear member rotatable upon the shaft and having a gear, means to rotate the gear member, a drum rotatable upon the shaft, an operating gear carried by the drum and engaging the first named gear, an operating element arranged near the drum, a crank connecting the operating gear and element, a pivotal support for the operating element, adjustable means connecting the pivotal support and the drum and adapted to lower the pivotal support with relation to the drum, means to turn the drum upon its pivot to shift the pivotal support horizontally, and a chopping device carried by the operating element.

5. In a machine of the character described, an operating element, pivotal supporting means for the operating element, means to shift the pivotal supporting means in a substantially true horizontal path, means to turn the element upon the pivotal supporting means, and a chopping device carried by the element.

6. In a machine of the character described, an operating element, a compensating pivotal supporting means for the element adapted to vertically move the same, a pivoted support for the compensating pivotal supporting means to move the same vertically and horizontally, means to turn the operating element upon the pivotal supporting means, and a chopping device carried by the element.

7. In a machine of the character described, a pivotally supported drum, an operating gear carried thereby, means to rotate the gear upon its axis, an operating element, a crank carried by the gear and pivoted to the operating element, a hobble link pivoted to the operating element, a master link pivoted to the hobble link and pivoted to the drum, a compensating lever, a link connecting one end of the compensating lever and the master link, a main crank, a link connecting the opposite end of the compensating link and the main crank, a link connecting the main crank and drum, a second crank pivotally connected with the compensating link between its ends, and means to turn said cranks and to hold them against turning movement, and a chopper device secured to the operating element.

8. In a machine of the character described, a pivoted operating element having a slot opening through the edge thereof, an arm pivotally connected with the operating element at a point spaced from the slot, a friction bolt connected with the arm at a separate point and arranged within the slot to frictionally engage therein, a spring engaging the arm and serving to turn the same upon its pivot so that the friction bolt is normally retained in the slot, a chopper carried by the arm, and means to swing the element upon its pivot.

9. In a machine of the character described, a support, an upstanding drum pivoted upon the support, a gear pivotally mounted upon the drum to move therewith and rotate with relation thereto and having a crank, an operating element pivotally connected with the crank, means to rotate the gear upon its axis, a master link pivotally mounted upon the drum for movement therewith and to turn with relation thereto, a hobble link pivotally connected with a master link and with the operating element, and means for turning the drum and master link upon their pivots.

10. In a machine of the character described, a support, an upstanding member pivoted upon the support, a gear pivotally mounted upon the member to move therewith and rotate in relation thereto, an operating element provided at its upper end with a plurality of arms, means for pivotally connecting one arm with the gear, means to drive the gear, a master link pivotally connected with the upstanding member to move therewith and turn with relation thereto and extending downwardly below the member, a hobble link pivotally connected with the lower portion of the master link and pivotally connected with the other arm of the operating element, means for controlling the movement of the pivoted member and master link upon their pivots, and a chopper connected with the operating element.

11. In a machine of the character described, a support, an upstanding member pivoted to the support, a gear pivotally mounted upon the upstanding member to move therewith and rotate with relation thereto, an operating element having operated connection with the gear, a compensating pivotal supporting means for the operating element having connection with said member, a chopper connected with the operating element, a compensating link, a link connecting one end of the compensating link and the compensating pivotal supporting means, a main crank having connection with the upper end of the compensating link, a second crank connected with the compensating link between the ends thereof, means to turn said cranks, and a link connected with the main crank and with the upstanding member.

12. In a machine of the character described, a support, an upstanding member pivoted to the support, a supporting device pivotally connected with the upstanding member, an operating element connected with the supporting device, driving means for the operating element connected with the upstanding member, a compensating link, means connecting the lower end of the compensating link and supporting device, a main crank, means connecting the main crank and the upper end of the compensating link, means connecting the main crank and the upstanding member, a second crank connected with the compensating link between its ends, means to turn said cranks, and a chopper connected with the operating element.

In testimony whereof I affix my signature.

WILLIAM J. WILSON.